United States Patent
Kinno et al.

(10) Patent No.: US 10,510,218 B2
(45) Date of Patent: Dec. 17, 2019

(54) INFORMATION PROCESSING APPARATUS, INFORMATION PROCESSING METHOD, AND NON-TRANSITORY STORAGE MEDIUM

(71) Applicant: NEC Corporation, Tokyo (JP)

(72) Inventors: Dai Kinno, Tokyo (JP); Kota Iwamoto, Tokyo (JP); Shinichi Matsumoto, Tokyo (JP); Yoshihiro Itou, Tokyo (JP); Shinya Yamasaki, Tokyo (JP); Kanako Taga, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 16/071,762

(22) PCT Filed: Dec. 13, 2016

(86) PCT No.: PCT/JP2016/086990
§ 371 (c)(1),
(2) Date: Jul. 20, 2018

(87) PCT Pub. No.: WO2017/126254
PCT Pub. Date: Jul. 27, 2017

(65) Prior Publication Data
US 2019/0026999 A1 Jan. 24, 2019

(30) Foreign Application Priority Data
Jan. 21, 2016 (JP) .................. 2016-009602

(51) Int. Cl.
*G07G 1/00* (2006.01)
*G07G 1/01* (2006.01)
(Continued)

(52) U.S. Cl.
CPC .......... *G07G 1/0054* (2013.01); *A47F 9/047* (2013.01); *G06Q 20/208* (2013.01); *G07G 1/00* (2013.01);
(Continued)

(58) Field of Classification Search
CPC .. G07G 1/0054; G07G 1/0063; G07G 1/0036; G07G 1/00; G07G 1/01; G06Q 20/208; A47F 9/047
See application file for complete search history.

(56) References Cited

U.S. PATENT DOCUMENTS 9,076,177 B2 *  7/2015  Gotanda ............ G06Q 30/0623
9,811,816 B2 * 11/2017  Sato ..................... G06Q 20/208
(Continued)

FOREIGN PATENT DOCUMENTS

JP   H07-320146 A   12/1995
JP   2008-33640 A    2/2008
(Continued)

OTHER PUBLICATIONS

International Search Report, Corresponding to PCT/JP2016/086990, dated Mar. 21, 2017, 2 pp.

*Primary Examiner* — Daniel I Walsh
(74) *Attorney, Agent, or Firm* — Wilmer Cutler Pickering Hale and Dorr LLP

(57) ABSTRACT

A checkout apparatus (10) includes an image data acquisition unit (11) that acquires data of an image; an image analysis unit (12) that recognizes a plurality of products in the image using a feature value of an exterior of each of the products registered in a feature value storage unit (14) and the data of the image; a reading necessity or non-necessity check unit (15) that extracts the product for which it is necessary to read a product code from among the recognized products, using an object-to-be-read storage unit (16) in
(Continued)

which the product for which it is necessary to read the product code is registered in advance; and a reading unit (17) that reads the product code of the product extracted by the reading necessity or non-necessity check unit (15).

15 Claims, 12 Drawing Sheets

(51) Int. Cl.
  *A47F 9/04* (2006.01)
  *G06Q 20/20* (2012.01)
(52) U.S. Cl.
  CPC ......... *G07G 1/0036* (2013.01); *G07G 1/0063* (2013.01); *G07G 1/01* (2013.01)

(56) References Cited

U.S. PATENT DOCUMENTS

| | | | | |
|---|---|---|---|---|
| 10,108,639 | B2* | 10/2018 | Masuko | G06K 9/6202 |
| 2001/0027995 | A1* | 10/2001 | Patel | G06K 7/10861 |
| | | | | 235/383 |
| 2005/0177463 | A1* | 8/2005 | Crutchfield, Jr. | G06Q 30/06 |
| | | | | 705/26.9 |
| 2006/0059049 | A1* | 3/2006 | Morris | G06Q 30/02 |
| | | | | 705/26.1 |
| 2009/0322706 | A1* | 12/2009 | Austin | G06F 3/038 |
| | | | | 345/175 |
| 2011/0161184 | A1* | 6/2011 | Lutz | G06Q 20/20 |
| | | | | 705/16 |
| 2012/0193416 | A1* | 8/2012 | Smith | G06K 7/10554 |
| | | | | 235/440 |
| 2013/0058541 | A1* | 3/2013 | Susaki | G06K 9/00 |
| | | | | 382/110 |
| 2013/0259320 | A1* | 10/2013 | Gotanda | G06Q 30/0623 |
| | | | | 382/110 |
| 2015/0062560 | A1* | 3/2015 | Tornwall | A47F 9/047 |
| | | | | 356/51 |
| 2015/0213425 | A1* | 7/2015 | Namura | G06Q 20/202 |
| | | | | 705/21 |
| 2016/0044300 | A1* | 2/2016 | Imai | H04N 1/00278 |
| | | | | 348/46 |
| 2016/0180315 | A1* | 6/2016 | Kanamori | G06Q 20/208 |
| | | | | 705/23 |
| 2017/0076270 | A1* | 3/2017 | Iizaka | G06Q 20/208 |
| 2019/0019173 | A1* | 1/2019 | Kinno | G07G 1/00 |
| 2019/0026999 | A1* | 1/2019 | Kinno | G07G 1/00 |
| 2019/0034904 | A1* | 1/2019 | Kinno | G07G 1/00 |

FOREIGN PATENT DOCUMENTS

| | | | |
|---|---|---|---|
| JP | 2012053713 A | * | 3/2012 |
| JP | 2013-054673 A | | 3/2013 |
| JP | 2013-69259 A | | 4/2013 |
| JP | 2013-175890 A | | 9/2013 |
| JP | 2013-210971 A | | 10/2013 |
| WO | WO-2012-005660 A1 | | 1/2012 |

* cited by examiner

FIG. 4

| PRODUCT ID | FEATURE VALUE |
|---|---|
| ⋮ | ⋮ |

FIG. 5

| PRODUCT ID | PRICE | PRODUCT NAME | . . . |
|---|---|---|---|
| ⋮ | ⋮ | ⋮ | ⋮ |
| | | | |

INFORMATION PROCESSING APPARATUS, INFORMATION PROCESSING METHOD, AND NON-TRANSITORY STORAGE MEDIUM

CROSS-REFERENCE TO RELATED APPLICATIONS

The present application is a national stage application of International Application No. PCT/JP2016/086990 entitled "Information Processing Device, Information Processing Method, and Program," filed on Dec. 13, 2016, which claims the benefit of priority from Japanese Patent Application No. JP2016-009602, filed on Jan. 21, 2016, the disclosures of which are incorporated herein in their entirety by reference thereto.

TECHNICAL FIELD

The present invention relates to an information processing apparatus, an information processing method, and a program.

BACKGROUND ART

Cash registers (for example, a point of sale (POS) register) are widely used in convenience stores, supermarkets, and other stores. In conventional art, registration work for products to be registered in cash registers at the time of checkout has been performed by reading product codes attached to products with a predetermined reader or operating operation objects (operation buttons, touch panel display apparatuses, or the like) included in the cash registers. There is a desire for technologies for efficiently performing registration works. Related technologies are disclosed in Patent Documents 1 to 3.

Patent Document 1 discloses an information processing apparatus that includes a first imaging unit, a recognition unit, and a determination unit. The first imaging unit images a placement surface of a placement platform on which an object is placed from a plurality of different imaging directions. The recognition unit recognizes an object corresponding to an object image for each first captured image by reading a feature value of the object image indicating an object contained in the first captured image from each of the first captured images captured in each of the plurality of imaging directions by the first imaging unit and comparing the feature value of each object stored in advance. The determination unit determines a recognition result of the object placed on the placement platform based on a recognition result of the object image for each first captured image. In the invention, various kinds of information are output through a display apparatus or a printer.

Patent Document 2 discloses a product reading apparatus that includes a display unit, a frame line display unit, a correction reception unit, a frame line correction unit, a product recognition unit, and an output unit. The display unit displays an image captured by an imaging unit. The frame line display unit displays a frame line surrounding a product contained in the image in the image displayed on the display unit. The correction reception unit receives an instruction to correct a frame line. The frame line correction unit corrects a frame line on a screen in response to the correction instruction. The product recognition unit recognizes a product contained in the image within the frame line. The output unit outputs information regarding the product recognized by the product recognition unit. In the invention, various kinds of information are also output through a display apparatus or a printer.

Patent Document 3 discloses an apparatus including a conveyer belt that transports a product, a starting button that starts an operation, a display apparatus that gives an instruction to perform work, a height measurement apparatus that measures the height of the product, an imaging apparatus that images the product, a first counter that performs counting when the height measurement apparatus and the imaging apparatus detect products, a barcode scanner that reads and decodes a barcode from a passing product by varying a focal distance or the like, a second counter that counts the number of products subjected to a registration process, and a POS terminal that processes an image from the imaging apparatus to determine the position, size, or the like of a product, performs a registration process based on product data of the scanner, and determines registration completion when the counted values of the first and second counters are identical after an ending button is operated. In the invention, various kinds of information are also output through a display apparatus or a printer.

RELATED DOCUMENT

Patent Document

[Patent Document 1] Japanese Laid-open Patent Publication No. 2013-54673
[Patent Document 2] Japanese Laid-open Patent Publication No. 2013-175890
[Patent Document 3] Japanese Laid-open Patent Publication No. H7-320146

SUMMARY OF THE INVENTION

Technical Problem

In recent years, technologies have been used of including not only product identification information but also attachment information such as a quality maintenance date or a lot number in the product code attached to each product.

When registration work is performed by reading a product code attached to each of a plurality of products using a predetermined reader, a checkout apparatus can acquire attachment information at the time of a checkout process. Then, a predetermined process can be performed according to content of the attachment information. For example, when a product having an expired quality maintenance date or a product having a lot number of which sale is restricted is being sold, output of an alarm or the like can be performed. As a result, it is possible to avoid selling such products in advance.

However, there is a room for improvement in work efficiency in registration work performed by reading a product code attached to each of a plurality of products using a predetermined reader.

In this view, as disclosed in Patent Documents 1 to 3, efficiency of registration work is expected by registering products through an image recognition process using exterior features of the products.

However, in a case of the registration work using the image recognition process, a checkout apparatus can merely obtain product identification information at the time of a checkout process and cannot acquire attachment information such as a quality maintenance date or a lot number. Therefore, the checkout apparatus cannot perform a process according to content of the above-described attachment information at the time of the checkout process. In addition, in the case of registration work using the image recognition process, there is also concern that different products with similar exteriors may be erroneously recognized.

An object of the invention is to provide a mechanism for solving the foregoing problems.

Solution to Problem

According to an aspect of the invention, there is provided an information processing apparatus including: an image data acquisition unit that acquires data of an image; an image analysis unit that recognizes a plurality of products in the image using a feature value of an exterior of each of the products registered in a feature value storage unit and the data of the image; a reading necessity or non-necessity check unit that extracts the product for which it is necessary to read a product code from among the products recognized by the image analysis unit, using an object-to-be-read storage unit in which the product for which it is necessary to read the product code corresponding to each of the products is registered in advance; and a reading unit that reads the product code of the product extracted by the reading necessity or non-necessity check unit.

According to another aspect of the invention, there is provided an information processing method performed by a computer, the method including: an image data acquisition step of acquiring data of an image; an image analysis step of recognizing a plurality of products in the image using a feature value of an exterior of each of the products registered in a feature value storage unit and the data of the image; a reading necessity or non-necessity check step of extracting the product for which it is necessary to read a product code from among the products recognized in the image analysis step, using an object-to-be-read storage unit in which the product for which it is necessary to read the product code corresponding to each of the products is registered in advance; and a reading step of reading the product code of the product extracted by the reading necessity or non-necessity check step.

According to still another aspect of the invention, there is provided a program causing a computer to function as: an image data acquisition unit that acquires data of an image; an image analysis unit that recognizes a plurality of products in the image using a feature value of an exterior of each of the products registered in a feature value storage unit and the data of the image; a reading necessity or non-necessity check unit that extracts the product for which it is necessary to read a product code from among the products recognized by the image analysis unit, using an object-to-be-read storage unit in which the product for which it is necessary to read the product code corresponding to each of the products is registered in advance; and a reading unit that reads the product code of the product extracted by the reading necessity or non-necessity check unit.

Advantageous Effects of Invention

According to the invention, a new technology not disclosed in conventional art is achieved in technologies for registering products using an image recognition process.

BRIEF DESCRIPTION OF THE DRAWINGS

The above-described purposes, other purposes, features, and advantages will become more apparent from preferred exemplary embodiments to be described below and the following drawings appended therein.

FIG. 4 is a diagram schematically illustrating an example of information registered in a feature value storage unit according to the exemplary embodiment.

FIG. 5 is a diagram schematically illustrating an example of information registered in a product information storage unit according to the exemplary embodiment.

DESCRIPTION OF EXEMPLARY EMBODIMENTS

First, an example of a hardware configuration of a checkout apparatus (an information processing apparatus) according to exemplary embodiments (first to third exemplary embodiments) will be described. Each functional constituent unit of the checkout apparatus may be configured with hardware (for example, a hard wired electronic circuit) realizing each functional constituent unit or may be configured in combination of hardware and software (for example, a combination of an electronic circuit and a program controlling the electronic circuit).

Figure 1:
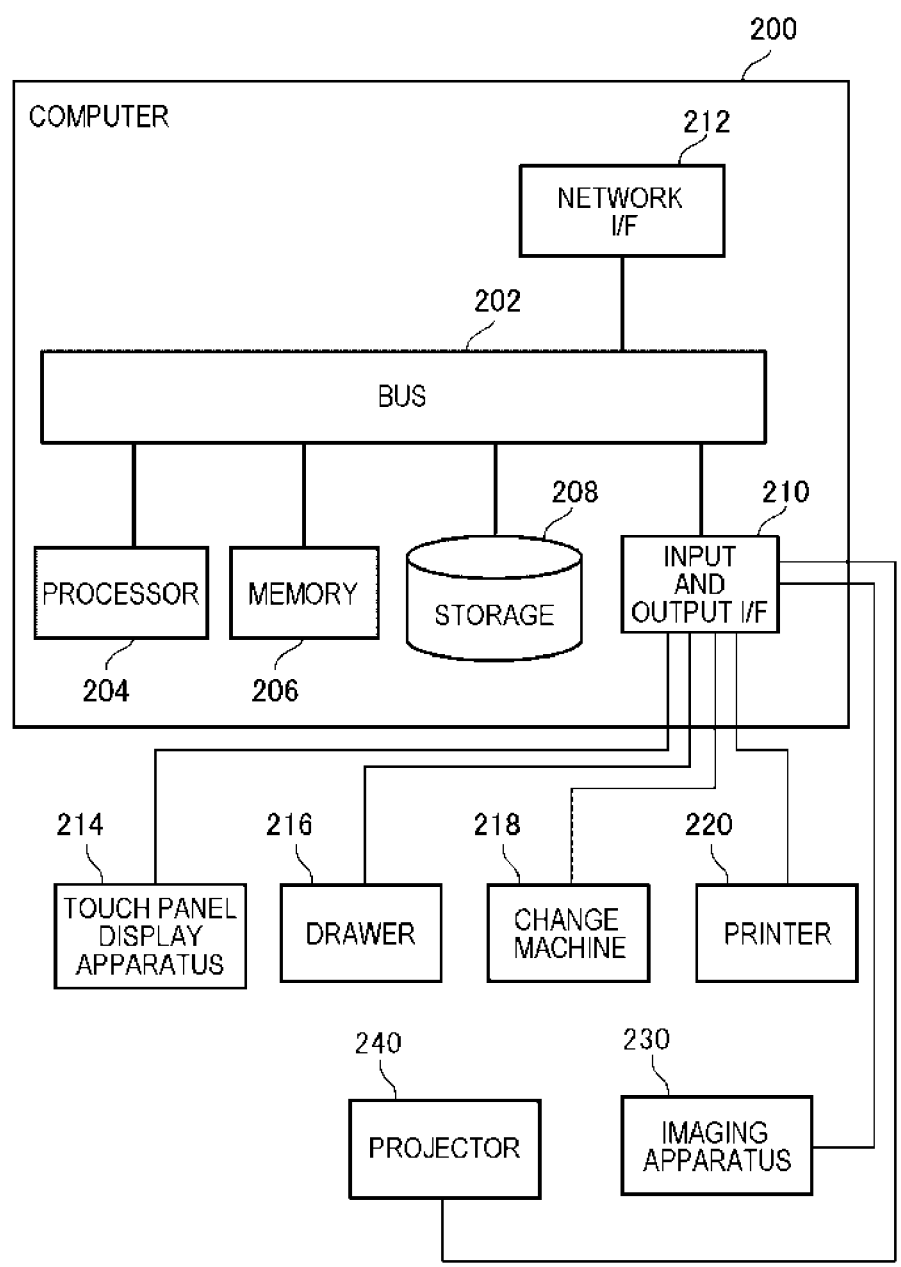
FIG. 1 is a diagram conceptually illustrating an example of a hardware configuration of an apparatus according to an exemplary embodiment.

FIG. 1 is a diagram exemplifying a hardware configuration of the checkout apparatus according to an exemplary embodiment. The hardware configuration may be achieved using a dedicated apparatus designed for a register terminal or may be achieved using a general-purpose apparatus such as a personal computer (PC) or a portable terminal.

A computer 200 includes a bus 202, a processor 204, a memory 206, a storage 208, an input and output interface 210, and a network interface 212. The bus 202 is a data transmission path through which the processor 204, the memory 206, the storage 208, the input and output interface 210, and the network interface 212 transmit and receive data one another. However, a method of connecting the processor 204 and the like to each other is not limited to connection by the bus. The processor 204 is an arithmetic processing apparatus such as a central processing unit (CPU) or a graphics processing unit (GPU). The memory 206 is a memory such as a random access memory (RAM) or a read-only memory (ROM). The storage 208 is a storage apparatus such as a hard disk, a solid-state drive (SSD), or a memory card. The storage 208 may be a memory such as RAM or a ROM.

The input and output interface 210 is an interface which connects the computer 200 to an input and output apparatus. For example, a touch panel display apparatus 214, a drawer 216, a change machine 218, a printer 220, an imaging apparatus 230, a projector 240, and the like are connected to the input and output interface 210. The touch panel display apparatus 214 is used, for example, to manually input a price of a product. The touch panel display apparatus 214 displays various kinds of information such as information regarding products registered as objects for checkout. The drawer 216 stores coins and bills. The change machine 218 includes an input port through which purchase money is put and a discharge port through which a change is discharged. The printer 220 issues a receipt or the like. The imaging apparatus 230 images a still image and/or records a video. The projector 240 projects a predetermined image. An input interface such as a keyboard other than the touch panel display apparatus 214 may be connected to the computer 200.

The network interface 212 is an interface that connects the computer 200 to an external apparatus so that communication is possible. The network interface 212 may be a network interface that makes connection to a wired line or may be a network interface that makes connection with a wireless line. For example, the computer 200 that realizes a checkout apparatus is connected to a store server or the like that manages various apparatuses installed in a store via a network.

The storage 208 stores a program module that implements each function (each functional unit) of the checkout apparatus. The processor 204 realizes each function corresponding to each program module by executing each program module. Here, the processor 204 may load each module into the memory 206 to execute each module or may not load each module into the memory 206 to execute each module when each module is executed.

The hardware configuration of the checkout apparatus is not limited to the configuration illustrated in FIG. 1. For example, each program module may be stored in the memory 206. In this case, the computer 200 may not include the storage 208. The computer 200 may not necessarily be connected to another apparatus so that communication is possible via a network. Accordingly, the computer 200 may not include the network interface 212. In a case where the checkout apparatus is not used for a process of paying purchase money, the checkout apparatus may not include the drawer 216, the change machine 218, and the printer 220. The checkout apparatus may not include the imaging apparatus 230 as long as an image captured by the imaging apparatus 230 can be acquired. In this case, the checkout apparatus is configured to be able to communicate with the imaging apparatus 230 to acquire image data from the imaging apparatus 230. The checkout apparatus may not include the projector 240.

Hereinafter, exemplary embodiments will be described. A functional block diagram used to describe the following exemplary embodiments illustrates a block of a functional unit rather than a configuration of a hardware unit. In the drawings, each apparatus is described so that the apparatus is configured with one apparatus, but a configuration mechanism is not limited thereto. That is, the apparatus may be divided physically or may be divided logically. The same reference numerals are given to the same constituent elements and the description thereof will not be appropriately repeated.

<First Exemplary Embodiment>

First, an overview of the checkout apparatus according to the exemplary embodiment will be described. The checkout apparatus according to the exemplary embodiment can perform product registration through an image recognition process. That is, the checkout apparatus analyzes data of an image captured so that a placement surface of a placement platform on which a product for checkout is placed is contained, and recognizes one product or a plurality of products shown in the image. In this recognition, an exterior feature of each product is used. The checkout apparatus registers one recognized product or a plurality of recognized products as products for checkout.

The checkout apparatus extracts a product for which it is necessary to read a product code from among the recognized products. The product code includes information from which a product identifier (ID) can be known. For example, a barcode such as a JAN code can be exemplified. For example, products for which it is necessary to read a product code includes a product for which it is necessary to check a quality maintenance date, a product for which it is necessary to check a best-before date, a product for which it is necessary to check a use-by date, and a product group of the same kind but different volume. Thereafter, the checkout apparatus extracts a product code of the extracted product from the image and reads the extracted product code.

In this way, the checkout apparatus according to the exemplary embodiment performs product registration through an image recognition process. Then, the checkout apparatus extracts a product for which it is necessary to read the product code based on a recognition result in the image recognition process and performs a process of reading the product code on only the extracted product.

Next, an application example of the checkout apparatus according to the exemplary embodiment will be described with reference to FIG. 2. The checkout apparatus includes a registration apparatus 1 and a processing apparatus 4. The checkout apparatus may further include an imaging apparatus 3. In the drawing, the registration apparatus 1 and the processing apparatus 4 are separately described, but these apparatuses may be integrated physically and/or logically. The imaging apparatus 3 and the processing apparatus 4 are separately described, but these apparatuses may be integrated physically and/or logically.

The hardware configuration of FIG. 1 is an example in which the registration apparatus 1 and the processing apparatus 4 are integrated logically. The registration apparatus 1 and the processing apparatus 4 include the computer 200 illustrated in FIG. 1. Then, the registration apparatus 1 includes the touch panel display apparatus 214, the drawer 216, the change machine 218, and the printer 220 illustrated in FIG. 1. The imaging apparatus 3 corresponds to the imaging apparatus 230 illustrated in FIG. 1.

The imaging apparatus 3 is connected to the processing apparatus 4 so that communication is possible. The registration apparatus 1 is connected to the processing apparatus 4 so that communication is possible. A communication standard is a design factor. Either wired or wireless communication may be performed.

The imaging apparatus 3 has a function of recording a video image and/or imaging a still image. The imaging apparatus 3 may continuously image data of a video.

Besides, the imaging apparatus 3 may capture a still image intermittently (also periodically). In this case, the imaging apparatus 3 can perform imaging at a predetermined timing (for example, a timing instructed by a worker) determined in advance.

The imaging apparatus 3 is installed at a predetermined position to image a placement surface of the placement platform 2. An installation position is a design factor. For example, the imaging apparatus 3 may be installed immediately above or obliquely above the placement surface of the placement platform 2 to image the placement surface from the direction. Besides, the imaging apparatus 3 may be installed on the placement surface of the placement platform 2 to image the placement surface from a transverse direction. In the drawing, four imaging apparatuses 3 are installed on the placement surface to image predetermined regions of the placement surface from four directions. Besides, the placement platform 2 may include a transparent member and/or a semitransparent member with transparency and the imaging apparatus 3 may be installed below the placement platform 2, as illustrated. In this case, the imaging apparatus 3 images the placement surface from underneath the placement platform 2.

Besides, the imaging apparatus 3 may be installed on a worker who performs registration work. For example, the imaging apparatus 3 may be installed on a hat, glasses, or the like which the worker wears. In this case, it is preferable to adjust a direction or the like of the imaging apparatus 3 to image a gaze direction of the worker.

In the drawing, six imaging apparatuses 3 are installed, but the number of imaging apparatuses and installation locations of the imaging apparatuses are design factors. Some of the illustrated imaging apparatuses 3 may not be installed or more imaging apparatuses 3 may be installed.

The processing apparatus 4 acquires image data from the imaging apparatus 3. Then, the processing apparatus 4 analyzes an image to recognize a product 6 contained in the image. In the recognition, an exterior feature of each product 6 is used. Thereafter, the processing apparatus 4 transmits a recognition result to the registration apparatus 1.

The processing apparatus 4 extracts the product 6 for which it is necessary to read the product code from among the recognized products 6. Then, the processing apparatus 4 searches for the product code of the extracted product 6 in the image to read the retrieved product code. Thereafter, the processing apparatus 4 performs a predetermined process in accordance with the read content.

The registration apparatus 1 has a function of registering the product 6 for checkout. The registration apparatus 1 registers the product 6 for checkout using information received from the processing apparatus 4.

The illustrated registration apparatus 1 includes a display apparatus 101, a display apparatus 102, a code reader 103, operation buttons 104, and a drawer 105.

The display apparatus 101 is oriented toward the near side of the placement platform 2 (the side of a product registration worker) so that the worker performing registration work mainly views the display apparatus 101. Information regarding a checkout process, a warning, and the like are displayed on the display apparatus 101. The display apparatus 101 may be a touch panel display apparatus.

The display apparatus 102 is oriented toward the far side of the placement platform 2 (the side of a customer) so that a shopper mainly views the display apparatus 102. Information regarding the checkout process, an advertisement, and the like are displayed on the display apparatus 102. The display apparatus 102 may be a touch panel display apparatus.

The code reader 103 reads a product code (1-dimensional code, a 2-dimensional code, or the like) attached to each product 6. The plurality of operation buttons 104 corresponding to various products, numbers, and various functions (for example, subtotals) are used to input the various products, the numbers, and the various functions. As described above, in the exemplary embodiment, the product registration can be performed through the image recognition process. Therefore, the code reader 103 and the operation buttons 104 are supplementarily used. Money, vouchers and the like are accommodated in the drawer 105.

The registration apparatus 1 only need to have at least a function of registering the product 6 for checkout and the registration apparatus may not have at least some of the illustrated functions.

The illustrated registration apparatus 1 has a configuration on the assumption that a store staff operates the registration apparatus 1, but may have a configuration on the assumption that the registration apparatus 1 is operated by a shopper.

Figure 3:
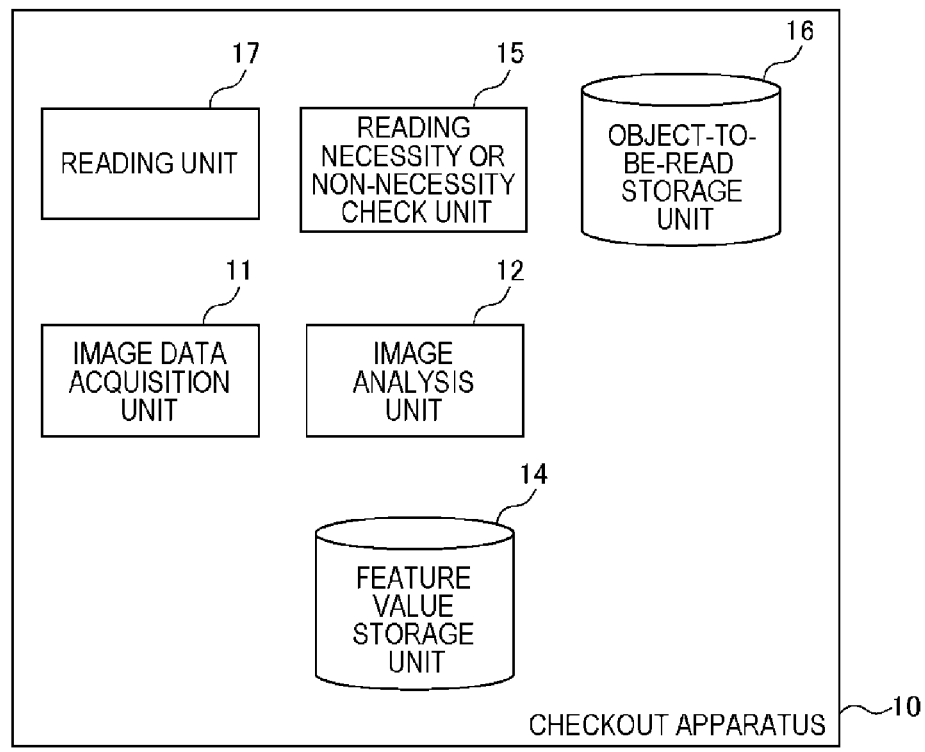
FIG. 3 is an exemplary functional block diagram illustrating the checkout apparatus according to the exemplary embodiment.

Next, a configuration of the checkout apparatus according to the exemplary embodiment will be described in detail. FIG. 3 is an exemplary functional block diagram illustrating the checkout apparatus 10 according to the exemplary embodiment. As illustrated, the checkout apparatus 10 includes an image data acquisition unit 11, an image analysis unit 12, a feature value storage unit 14, a reading necessity or non-necessity check unit 15, an object-to-be-read storage unit 16, and a reading unit 17. Although not illustrated, the checkout apparatus 10 may further include a registration unit 13.

The checkout apparatus 10 may not include the feature value storage unit 14. In this case, another apparatus logically separate from the checkout apparatus 10 includes the feature value storage unit 14. The checkout apparatus 10 is configured to communicate with the other apparatus and to be able to acquire information stored in the feature value storage unit 14.

The checkout apparatus 10 may not include the object-to-be-read storage unit 16. In this case, another apparatus logically separated from the checkout apparatus 10 includes the object-to-be-read storage unit 16. The checkout apparatus 10 is configured to communicate with the other apparatus and acquire information stored in the object-to-be-read storage unit 16.

Figure 2:
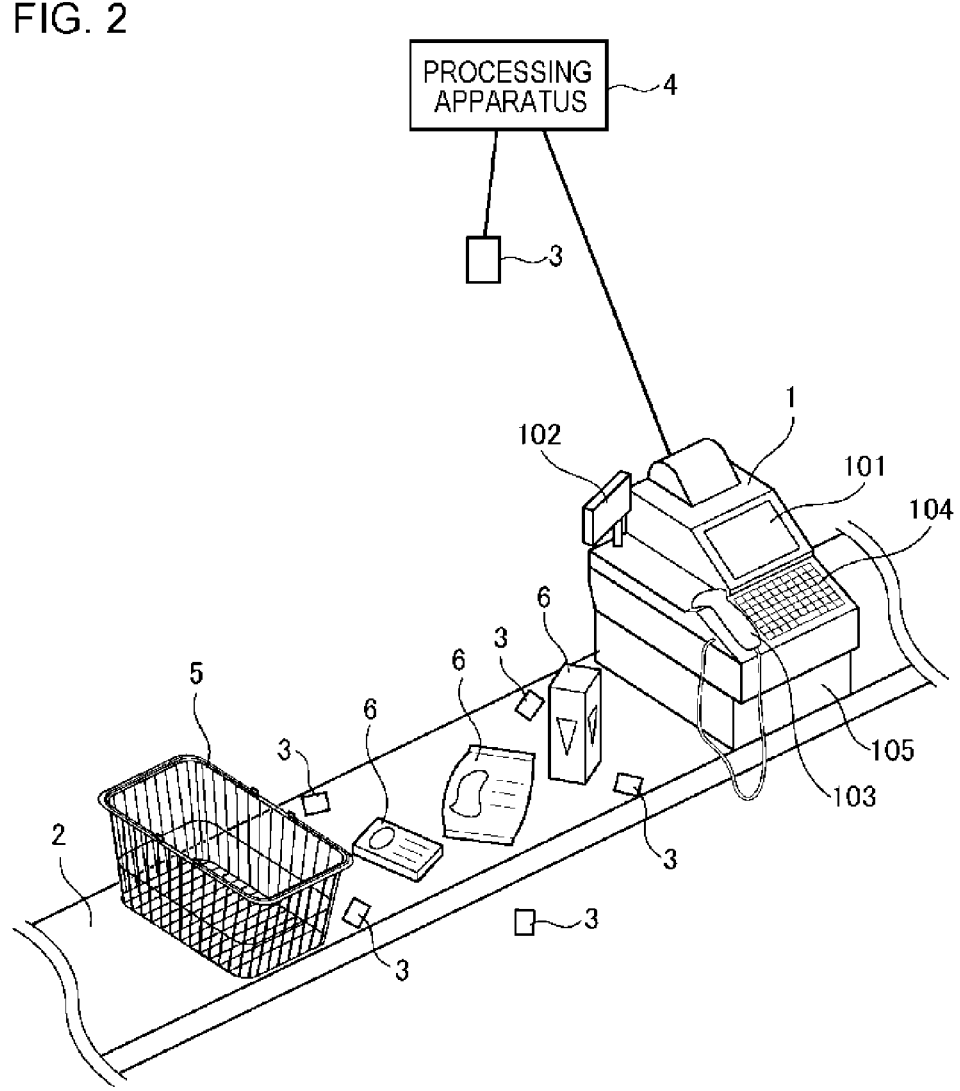
FIG. 2 is a diagram illustrating an application example of a checkout apparatus according to the exemplary embodiment.

As illustrated above, the checkout apparatus 10 includes the registration apparatus 1 and the processing apparatus 4 illustrated in FIG. 2. The image data acquisition unit 11 is realized by the processing apparatus 4. The image analysis unit 12 is realized by the processing apparatus 4. The registration unit 13 is realized by the registration apparatus 1. The feature value storage unit 14 may be realized by the processing apparatus 4. The reading necessity or non-necessity check unit 15 is realized by the processing apparatus 4. The object-to-be-read storage unit 16 may be realized by the processing apparatus 4. The reading unit 17 is realized by the processing apparatus 4.

The image data acquisition unit 11 acquires data of an image captured so that the placement surface of the placement platform on which a product for checkout is placed is contained. The image data acquisition unit 11 acquires data of an image captured by the imaging apparatus 3 described with reference to FIG. 2 in real time.

The image analysis unit 12 recognizes one product or a plurality of products shown in the image using the data of the image acquired by the image data acquisition unit 11 (a recognition process). The image analysis unit 12 can recognize one product or a plurality of products in each frame by performing the recognition process for each frame.

Figure 4:
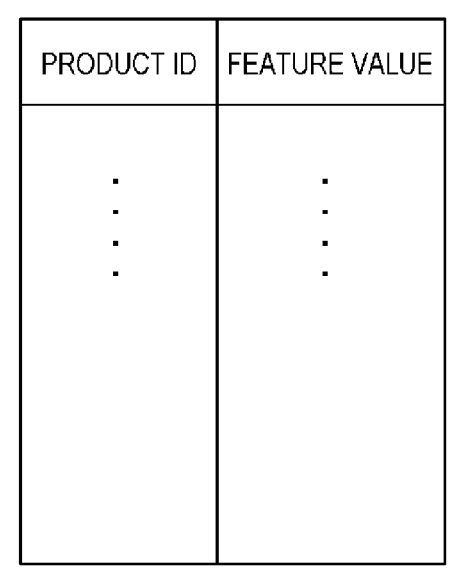

In the recognition process, the image analysis unit 12 uses the feature value storage unit 14 in which a feature value of the exterior of each of a plurality of products is registered in advance. FIG. 4 is a diagram schematically illustrating an example of information stored in the feature value storage unit 14. In the illustrated example, a product ID for identifying each of a plurality of products is associated with a feature value of the exterior of each of the plurality of products. As the feature value, a shape, a color, a color distribution, or the like can be exemplified, but the invention is not limited thereto. The feature value storage unit 14 may store a feature value of each of a plurality of exteriors when each product is observed from each of a plurality of directions, corresponding to each product.

An algorithm for product recognition performed by the image analysis unit 12 using the image data and the feature value storage unit 14 is a design factor and all technologies can be adopted. For example, the technologies disclosed in Patent Documents 1 to 3 may be adopted.

The registration unit 13 registers one product or a plurality of products recognized by the image analysis unit 12 as a product for checkout. For example, the registration unit 13 may perform the product registration using a product information storage unit (not illustrated) in which product information regarding each of the plurality of products is registered in advance.

Figure 5:
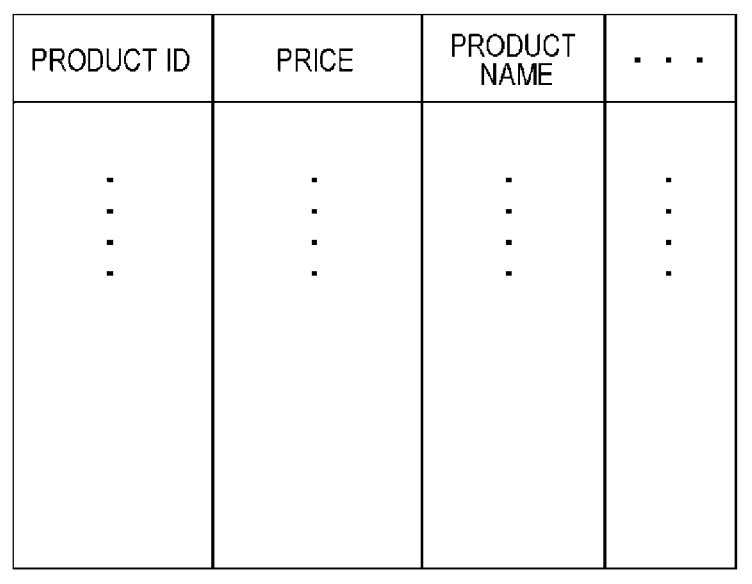

FIG. 5 is a diagram schematically illustrating an example of product information stored in the product information storage unit. A products ID and a name and a price of each product are associated with one another in the illustrated product information. The product information may not include some of them or may include another piece of information.

The checkout apparatus 10 may include the product information storage unit. Besides, another apparatus logically separated from the checkout apparatus 10 may include the product information storage unit. In the latter case, the checkout apparatus 10 is configured to communicate with the other apparatus and to be able to acquire the product information stored in the product information storage unit.

For example, the registration unit 13 searches the product information storage unit using the product ID of one product or a plurality of products recognized by the image analysis unit 12 as a key to acquire the product information (for example, a name, a price, or the like) corresponding to the key. Then, the registration unit 13 registers the acquired product information.

Referring back to FIG. 3, the reading necessity or non-necessity check unit 15 extracts a product for which it is necessary to read the product code from among the products recognized by the image analysis unit 12 using the object-to-be-read storage unit 16.

In the object-to-be-read storage unit 16, a product (for example, a product ID) for which it is necessary to read the product code corresponding to each product is registered in advance. Hereinafter, an example of the product registered in the object-to-be-read storage unit 16 will be described.

For example, a product for which it is necessary to check attachment information (for example, a package number, a weight, a lot number, a quantity, a manufacturing date, a quality maintenance date, a use-by date, a best-before date, a shipment destination, a purchase order number, and the like) included in the product code may be registered in the object-to-be-read storage unit 16 before sale.

When a problem is found in the product and sale of the product with a predetermined lot number (a predetermined package number, a predetermined purchase order number, or the like may be used) is restricted, it is preferable to check the attachment information of each product before sale. For example, as the reason, it is necessary to check the attachment information before sale.

Besides, when there are a quality maintenance date, a use-by date, a best-before date, and the like in the product, it is preferable to check whether the dates pass before sale. For example, as the reason, it is necessary to check the attachment information before sale.

Besides, in the product recognition process by the image analysis unit 12, a product for which a possibility of being erroneously recognized as another product is equal to or greater than a predetermined level may be registered in the object-to-be-read storage unit 16.

For a product group of which exterior features are similar at a predetermined level or more but are different from each other, there is a possibility of being erroneously recognized as other products in the product recognition process by the image analysis unit 12. An example of the product group includes a product group of the same kind but different volume. More specifically, "Juice A of 350 ml and Juice A of 500 ml", "Sweet B of 90 g and Sweet B of 210 g", and the like can be exemplified. For the product group of the same kind but different volume, package designs are substantially the same and only sizes, text information, or the like are different.

The reading necessity or non-necessity check unit 15 extracts a product for which it is necessary to read the product code from among the products recognized by the image analysis unit 12 by searching the object-to-be-read storage unit 16 using the product ID of the product recognized by the image analysis unit 12 as a key.

When the reading necessity or non-necessity check unit 15 extracts a product (the product ID) for which it is necessary to read the product code, the above-described image analysis unit 12 performs a process of analyzing an image and extracting the product code of the product. For example, the image analysis unit 12 searches an area in the image in which the product for which it is necessary to read the product code is shown and extracts the product code from the area. The image analysis unit 12 retains the exterior feature values of the product codes in advance, and thus can achieve the extraction of the product code by searching for the feature values in the image.

As illustrated in FIG. 2, when the placement surface is imaged from a plurality of directions by the plurality of imaging apparatuses 3, the image data acquisition unit 11 can acquire data of the images from the plurality of directions captured to contain that the placement surface from the plurality of directions. Then, the image analysis unit 12 can analyze the data of the images from the plurality of directions and extract the product code. The product code is not shown in the image from a certain direction, but there is a possibility of the product code being shown in the image from another direction. Therefore, by analyzing the data of the images from the plurality of directions, it is possible to increase a probability at which the product code of a predetermined product can be extracted.

Incidentally, when the product code of a first product 6 recognized in a first image captured by a first imaging apparatus 3 is searched for in a second image captured by a second imaging apparatus 3, it is first necessary to identify the first product 6 in the second image. The identification unit is a design factor and an example of the identification unit will be described below.

For example, the image analysis unit 12 may in advance store a conversion rule (for example, a conversion expression or the like configured with a matrix or the like) for converting coordinates of an arbitrary point in the first image of the placement surface shown in the image into coordinates of any point in the second image of the placement surface shown in the image. Then, the image analysis unit 12 may calculate the coordinates at which the first product 6 (placed on the placement surface) shown at predetermined coordinates in the first image in the image is shown in the second image, using the conversion rule. Then, the image analysis unit 12 may identify a product shown at the calculated coordinates in the second image as the first product 6.

Besides, the image analysis unit 12 may identify the first product 6 in the second image by searching the second image using the exterior feature value of the first product 6 recognized in the first image as a key.

The reading unit 17 reads the product code extracted from the image by the image analysis unit 12. As a result, the reading unit 17 can acquire the attachment information such as a package number, a weight, a lot number, a quantity, a manufacturing date, a quality maintenance date, a best-before date, a use-by date, a shipment destination, and a purchase order number, in addition to the product ID indicated by the product code. The product code may directly indicate the attachment information. In this case, the reading unit 17 acquires the attachment information by reading and analyzing the product code. Besides, the reading unit 17 may acquire the product ID by reading and analyzing the product code. Then, the reading unit 17 may acquire the attachment information by searching a database storing the product ID and the attachment information in association with each other using the acquired product ID as a key.

Thereafter, the checkout apparatus 10 can perform a predetermined check process on the basis of the information acquired by the reading unit 17.

For example, the checkout apparatus 10 may check whether content of the attachment information (for example, a package number, a lot number, a purchase order number, and the like) obtained by reading the product code matches attachment information (registered in advance) of a product for which sale of the product is restricted. When the content of the attachment information does not match the attachment information, the checkout apparatus 10 continues the checkout process without change. Conversely, when the content of the attachment information matches the attachment information, the checkout apparatus 10 outputs a warning indicating the matching. The warning includes information for specifying the product (included in objects for checkout) of which sale is restricted and information indicating that the sale of the product is restricted. The warning may be output through the display apparatus 101 or the display apparatus 102 illustrated in FIG. 2.

Besides, the checkout apparatus 10 may check whether the quality maintenance date (or the best-before date or the use-by date) has passed by comparing date information at that time to the quality maintenance date (or the best-before date or the use-by date) obtained by reading the product code. When the quality maintenance date has not passed, the checkout apparatus 10 continues the checkout process without change. Conversely, when the quality maintenance date has passed, the checkout apparatus 10 outputs a warning indicating the expiration. The warning includes information for specifying the product of which the quality maintenance date (or the best-before date or the use-by date) has passed and information indicating that sale of the product is restricted. The warning may be output through the display apparatus 101 or the display apparatus 102 illustrated in FIG. 2.

Besides, the checkout apparatus 10 may check whether the recognition by the image analysis unit 12 is erroneous or the like by comparing the product ID obtained by reading the product code to the product ID of the product recognized by the image analysis unit 12 and extracted because of necessity of reading the product code. When the product IDs match, the checkout apparatus 10 continues the checkout process without change. Conversely, when the product IDs do not match, the content registered by the registration unit 13 is changed from the product ID based on the recognition result by the image analysis unit 12 to the product ID obtained by reading the product code.

Figure 6:
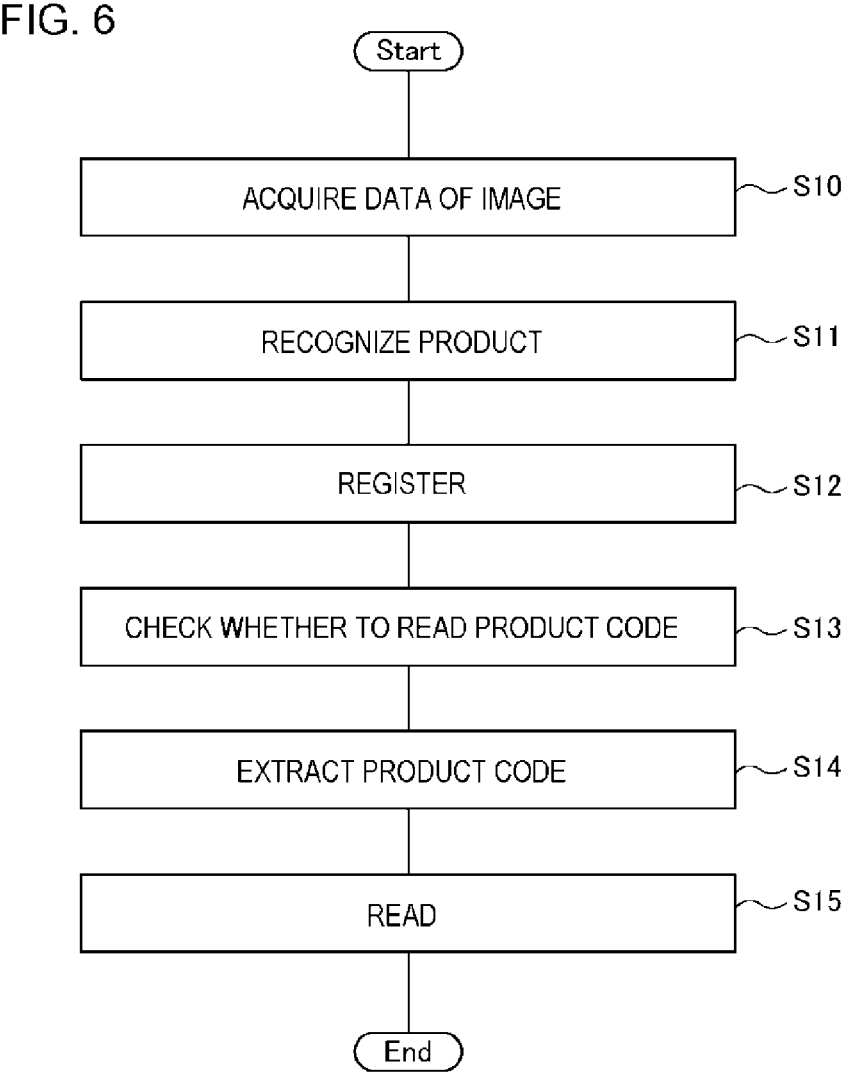
FIG. 6 is a flowchart illustrating an example of a flow of a process of the checkout apparatus according to the exemplary embodiment.

Next, an example of a flow of a process of the checkout apparatus 10 according to the exemplary embodiment will be described with reference to FIG. 2 and the flowchart of FIG. 6.

First, a shopper browses in a store and puts products 6 for purchase into a shopping basket 5. Thereafter, the shopper moves to a location of the checkout apparatus 10 for the checkout process.

A store staff who performs registration work places the products 6 contained in the shopping basket 5 at a predetermined position on the placement surface of the placement platform 2, as illustrated in FIG. 2. Thus, the products 6 are shown in a captured image captured by the imaging apparatus 3.

Then, the image data acquisition unit 11 (the processing apparatus 4) acquires data of the image from the imaging apparatus 3 (S10).

Thereafter, the image analysis unit 12 (the processing apparatus 4) analyzes the data of the image to recognize the products 6 shown in the image. Then, a recognition result is transmitted to the registration apparatus 1.

The registration unit 13 (the registration apparatus 1) registers the recognized products 6 as the product 6 for checkout when the recognition result is received.

The reading necessity or non-necessity check unit 15 (the processing device 4) extracts the product 6 for which it is necessary to read the product code from among the products 6 recognized in S11 (S13). When the product 6 is extracted in S13, the image analysis unit 12 (the processing apparatus 4) analyzes the data of the image acquired in S10 to extract the product code from the area in the image in which the product 6 for which it is necessary to read the product code is shown(S14).

Thereafter, the reading unit 17 reads the product code extracted in S14 (S15). Thus, the product ID or the attachment information of the product 6 for which it is necessary to read the product code is acquired from the product code. Thereafter, the checkout apparatus 10 can perform a predetermined check process on the basis of the information acquired by the reading unit 17. The details of the predetermined check process have been described above.

When the registration work for all the products 6 for purchase is completed, the store staff performs a checkout process, a payment process, or the like by operating the registration apparatus 1.

For example, the store staff performs a predetermined operation (for example, pressing of "a subtotal" button) on the operation button 104 to complete the registration work. Then, the store staff checks a total purchase amount displayed on the display apparatus 101 and notifies the total purchase amount to the shopper. Thereafter, the store staff receives a payment or the like from the shopper.

Subsequently, the store staff performs a predetermined operation on the operation button 104 to input the received payment amount. Then, a change amount is displayed on the display apparatus 101 and the drawer 105 is opened. The store staff accommodates the payment in the drawer 105 and extracts the change from the drawer 105. Then, the store staff delivers the extracted change to the shopper.

The flow of the checkout process, the payment process, or the like is merely exemplary and the process differs according to the configuration of the registration apparatus 1.

The checkout apparatus 10 according to the above-described exemplary embodiment can perform the product registration through the image recognition process. Therefore, efficiency of the product registration work is achieved.

The checkout apparatus 10 according to the exemplary embodiment can extract a product for which it is necessary to read the product code from among the recognized products. Then, the product code of the extracted product can be extracted from the image and the extracted product code can be read. In this way, the checkout apparatus 10 according to the exemplary embodiment can read the product codes of only the products extracted because of necessity of reading the product code without reading the product codes of all the products. In this case, in comparison with a case in which the product codes of all the products are read, efficiency of the work is achieved.

The checkout apparatus 10 according to the exemplary embodiment reads the product codes of the necessary products, and therefore can check the attachment information such as a lot number or check the quality maintenance date, the best-before date, the use-by date, or the like at the time of sale. As a result, it is possible to avoid in advance selling products which is not preferable to sell.

According to the exemplary embodiment, it is possible to read the product code of a product for which a possibility of being erroneously recognized as another product in the product recognition process by the image analysis unit 12 is equal to or greater than a predetermined level. Then, it is possible to collate the read content with the recognition result by the image analysis unit 12 and reflect a collation result in the product registration. Therefore, it is possible to avoid erroneous registration due to erroneous recognition by the image analysis unit 12.

According to the exemplary embodiment, the checkout apparatus 10 can extract the product for which it is necessary to read the product code from among the recognized products. Therefore, the worker may not necessary perform the extraction work. As a result, it is possible to avoid deterioration in the efficiency of the registration work due to the extraction work.

In the exemplary embodiment, it is possible to achieve the extraction of the product code of a predetermined product by searching an area in which the product is shown in the image. That is, it is possible to set only a part of the image as an object to be searched without setting the entire image as the object to be searched. Therefore, a processing burden on a computer related to the product code extraction process can be reduced. It is possible to shorten a time necessary for the process.

In the exemplary embodiment, it is possible to analyze the data of the plurality of images obtained by imaging the placement surface from the plurality of directions and to extract the product codes. Therefore, it is possible to achieve the extraction of the product codes at a high probability.

<Second Exemplary Embodiment>

A checkout apparatus 10 according to the exemplary embodiment includes a projection apparatus that projects an image related to a checkout process on a placement surface of a placement platform or a product.

Figure 7:
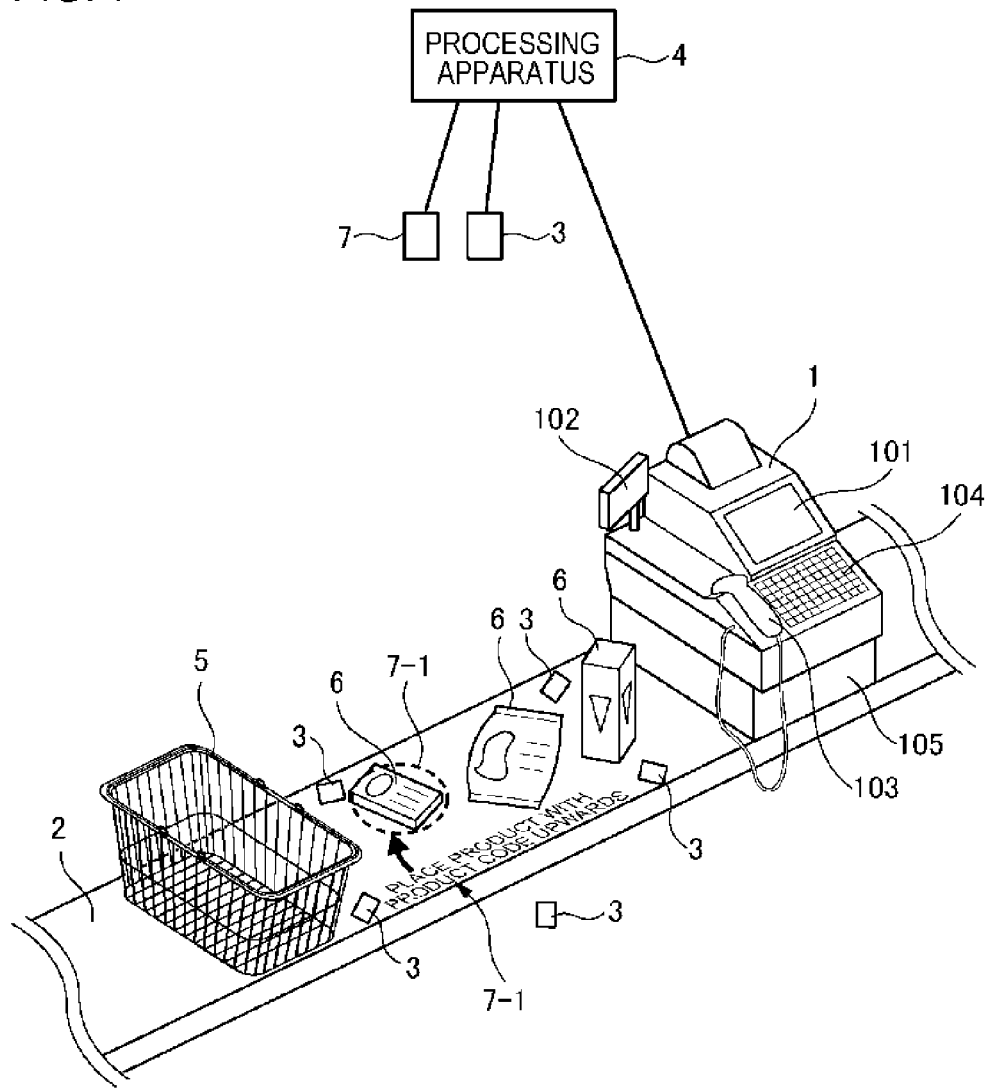
FIG. 7 is a diagram illustrating an example of an image projected by an output unit according to the exemplary embodiment.

An example of application to the checkout apparatus according to the exemplary embodiment will be described with reference to FIG. 7. The checkout apparatus includes a registration apparatus 1, a processing apparatus 4, and a projection apparatus 7. The checkout apparatus may further include an imaging apparatus 3. The configurations of the registration apparatus 1 and the imaging apparatus 3 are the same as those of the first exemplary embodiment. In FIG. 7, the imaging apparatus 3, the processing apparatus 4, and the projection apparatus 7 are separately described, but some of these apparatuses may be integrated physically and/or logically.

The projection apparatus 7 projects an image related to a checkout process on the placement surface of the placement platform 2 and/or the product 6. The projection apparatus 7 is installed at a predetermined position at which the projection can be performed. The installation position is a design factor. For example, the projection apparatus 7 may be installed immediately above or obliquely above the placement surface to project an image from the direction. Besides, the projection apparatus 7 may be installed on the placement surface to project the image from a transverse direction. Besides, the placement platform 2 may include a transparent member and the projection apparatus 7 may be installed below the placement platform 2. In this case, the projection apparatus 7 projects the image to the placement surface of the placement platform 2 from underneath the placement platform 2. The projection apparatus 7 includes the projector 240 illustrated in FIG. 1.

The processing apparatus 4 controls the projection apparatus 7. That is, the processing apparatus 4 transmits control information indicating the image to be projected or a position to which the image is projected to the projection apparatus 7. The projection apparatus 7 projects a predetermined image on the placement surface of the placement platform 2 or the product 6 in accordance with the control information. The other remaining configuration of the processing apparatus 4 is the same as that of the first exemplary embodiment.

Figure 8:
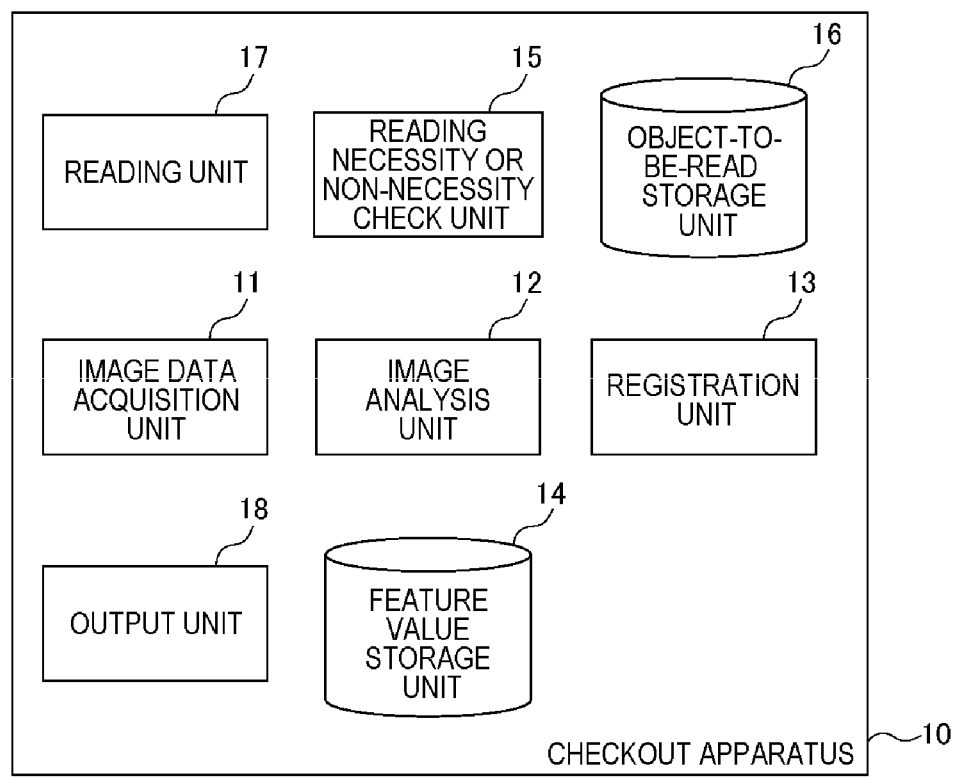
FIG. 8 is an exemplary functional block diagram illustrating the checkout apparatus according to the exemplary embodiment.

FIG. 8 is an exemplary functional block diagram illustrating the checkout apparatus 10 according to the exemplary embodiment. As illustrated, the checkout apparatus 10 includes an image data acquisition unit 11, an image analysis unit 12, a registration unit 13, a feature value storage unit 14, a reading necessity or non-necessity check unit 15, an object-to-be-read storage unit 16, a reading unit 17, and an output unit 18.

The checkout apparatus 10 may not include at least one of the feature value storage unit 14 and the object-to-be-read storage unit 16. The assumption when the checkout apparatus 10 does not include the unit is the same as that of the first exemplary embodiment.

The image data acquisition unit 11, the image analysis unit 12, the registration unit 13, the feature value storage unit 14, the reading necessity or non-necessity check unit 15, the object-to-be-read storage unit 16, and the reading unit 17 are the same as those of the first exemplary embodiment.

The output unit 18 is realized by the registration apparatus 1, the processing apparatus 4, the projection apparatus 7, and the like. The output unit 18 projects a predetermined image on the placement surface of the placement platform and/or the product. The image to be projected includes information regarding the checkout process and is configured in any form such as text, a number, a sign, or a figure. The image may be configured with many colors. The image may be a still image or may be a video.

For example, the output unit 18 outputs (projects) guidance information of a method of placing a product for which it is necessary to read the product code "when the image analysis unit 12 cannot extract the product code from the image" and/or "when the product code is extracted from the image by the image analysis unit 12 but the reading unit 17 cannot read the product code (for example, an image is obscure)".

FIG. 7 illustrates an example of the guidance information. In the drawing, one product 6 is specified with an image 7-1 of a circular mark, and the placement method is guided with the image 7-1 of text information "Place product with product code upwards". The circular mark is merely an example and the invention is not limited thereto.

For example, the output unit 18 can determine a position at which the image 7-1 corresponding to the one product 6 is projected in the following way. The output unit 18 acquires "positional information (coordinates) of each of the recognized products 6 in the image" from the image analysis unit 12. Then, the output unit 18 determines the position to which the image 7-1 corresponding to one product 6 is projected, using the information.

For example, the output unit 18 in advance retains a conversion rule (for example, a conversion expression or the like configured with a matrix or the like) for converting coordinates in an image into coordinates in a projection area. Then, the output unit 18 converts "the coordinates of each of the products recognized by the image analysis unit 12 in the image" into coordinates in the projection area based on the conversion rule. Then, the output unit 18 determines a position to which the image 7-1 is projected based on the converted coordinates in the projection area. For example, the output unit 18 may set the converted coordinates in the projection area as a position to which the image 7-1 is projected. Besides, the output unit 18 may set a position (for example, a position distant by a predetermined short distance in the right direction) that has a predetermined relation with the converted coordinates in the projection area as the position to which the image 7-1 is projected.

The output unit 18 may output the information to the display apparatus 101 in addition to or instead of the image.

Incidentally, in the first exemplary embodiment, the example in which a warning is output through the display apparatus 101 or the display apparatus 102 when products for sale includes a product of which sale is restricted or a product of which a quality maintenance date, a best-before date, a use-by date, or the like has passed has been described. The warning may be output as a predetermined image by the projection apparatus 7.

Figure 9:
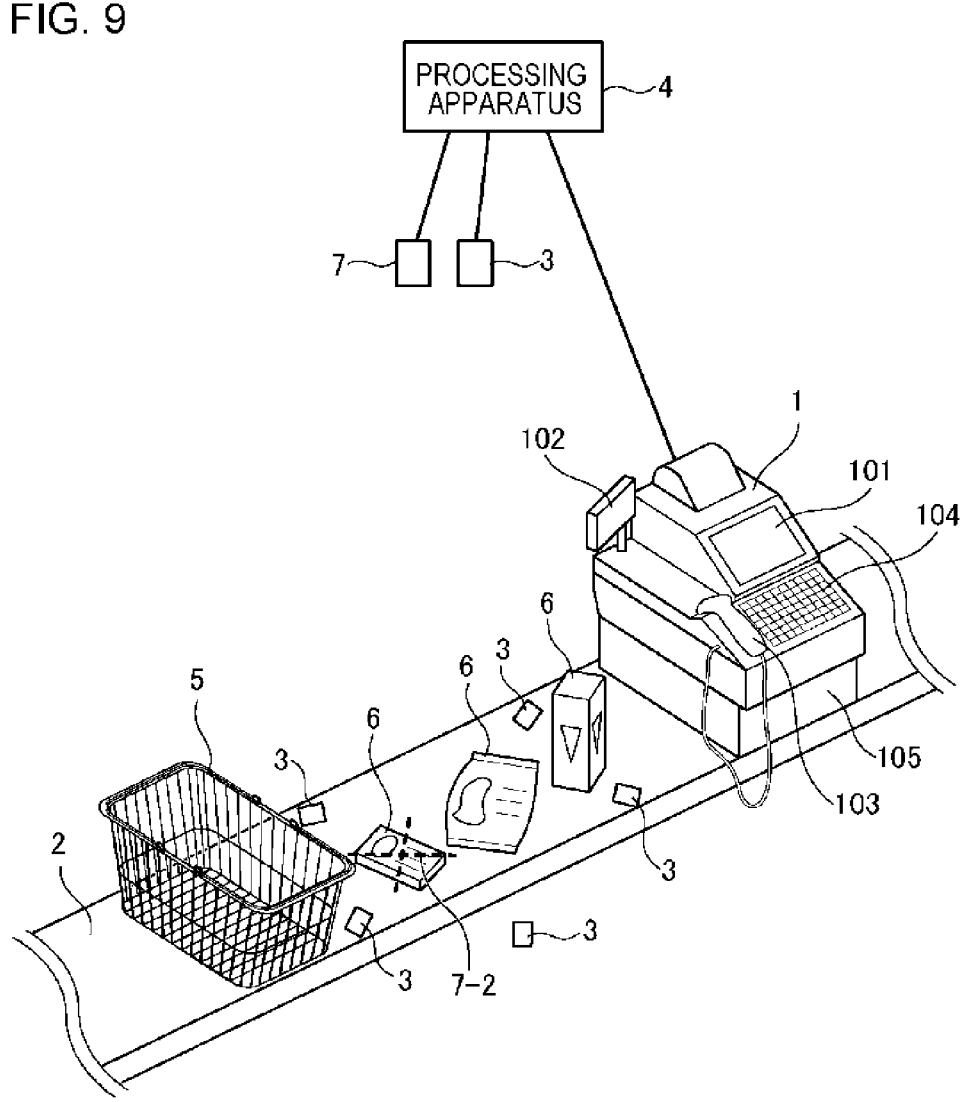
FIG. 9 is a diagram illustrating an example of an image projected by the output unit according to the exemplary embodiment.

For example, as illustrated in FIG. 9, an image 7-2 of an X mark may be projected to the product 6 of which sale is restricted or the product 6 of which a quality maintenance date, a best-before date, a use-by date, or the like has passed. The X mark is merely an example and the invention is not limited thereto. A method of determining the position to which the image 7-2 is projected can be achieved similarly to the method of determining the position to which the image 7-1 is projected.

According to the above-described exemplary embodiment, it is possible to realize the operational effects similar to those of the first exemplary embodiment.

According to the exemplary embodiment, an image related to the checkout process can be projected to the placement surface of the placement platform or the product using the projection apparatus. In this case, a worker who performs registration work can view the image projected on the placement surface of the placement platform or the product while performing predetermined work (for example, arranging a plurality of products on the placement surface of the placement platform so as not to overlap or adjusting a way (a direction or the like) of placing each product so that characteristic portions are imaged) facing the placement platform. As a result, it is possible to reduce a problem of overlooking the image (information) during the work.

According to the exemplary embodiment, when the process of reading the product code of a predetermined product is not performed well, it is possible to output guidance information of the method of placing the product. When a reason why the reading process is not performed well is in the method of placing the product, there is a possibility of resolving the problem using the guidance information.

<Third Exemplary Embodiment>

In the first and second exemplary embodiments, when a product for which it is necessary to read the product code is included, the product code of the product is extracted from the image and the reading process is performed. In the exemplary embodiment, when a product for which it is necessary to read the product code is included, a worker is notified that the product for which it is necessary to read the product code is included. According to the notification, the worker can read the product code of the product by operating a code reader or the like.

FIG. 8 is an exemplary functional block diagram illustrating a checkout apparatus 10 according to the exemplary embodiment, as in the second exemplary embodiment. As illustrated, the checkout apparatus 10 includes an image data acquisition unit 11, an image analysis unit 12, a registration unit 13, a feature value storage unit 14, a reading necessity or non-necessity check unit 15, an object-to-be-read storage unit 16, a reading unit 17, and an output unit 18.

The checkout apparatus 10 may not include at least one of the feature value storage unit 14 and the object-to-be-read storage unit 16. The assumption when the checkout apparatus 10 does not include the unit is the same as that of the first and second exemplary embodiments.

The image data acquisition unit 11, the image analysis unit 12, the registration unit 13, the feature value storage unit 14, the reading necessity or non-necessity check unit 15, the object-to-be-read storage unit 16, and the reading unit 17 are the same as those of the first and second exemplary embodiments.

The output unit 18 projects a predetermined image on the placement surface of the placement platform and/or the product. The image to be projected includes information regarding a checkout process and is configured in any form such as text, a number, a sign, or a figure. The image may be configured with many colors. The image may be a still image or may be a video.

For example, the output unit 18 outputs (projects) information for specifying a product for which it is necessary to read the product code.

Figure 10:
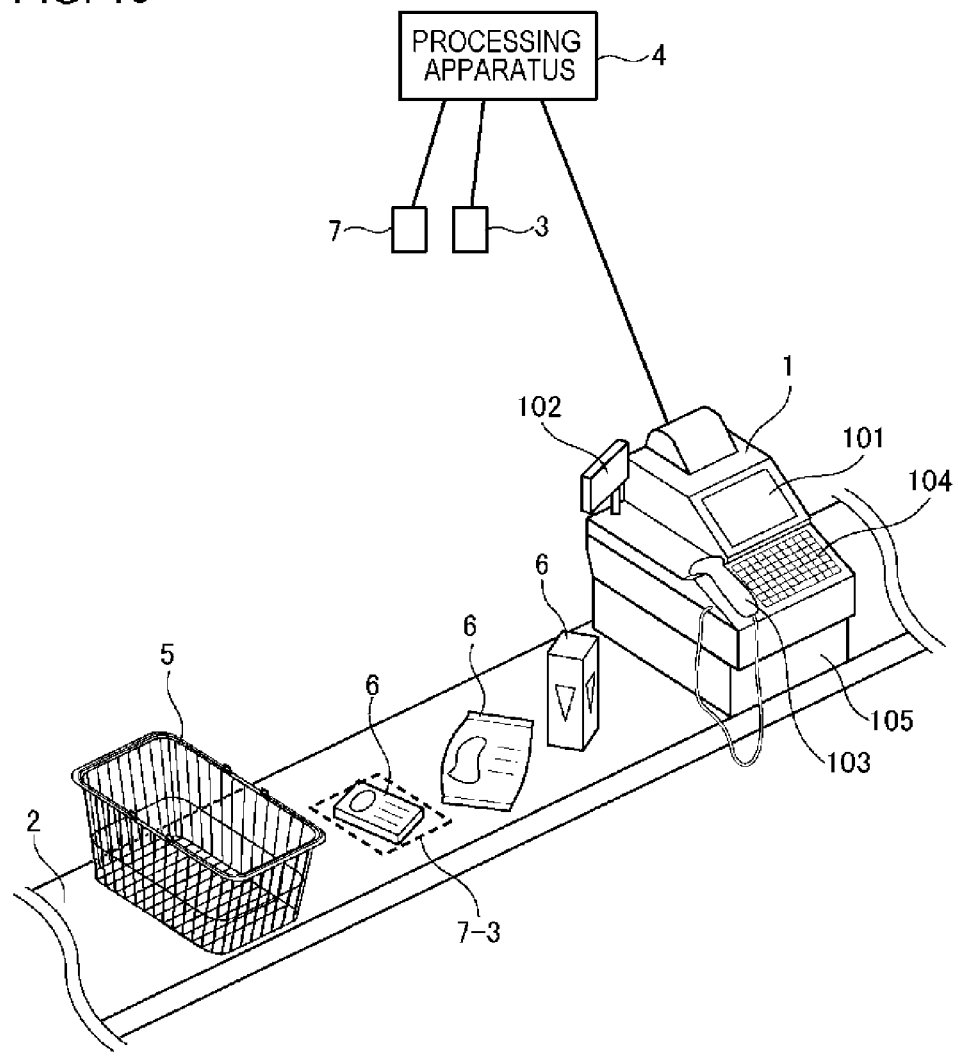
FIG. 10 is a diagram illustrating an example of an image projected by the output unit according to the exemplary embodiment.

FIG. 10 is a diagram illustrating an example of the information. In the drawing, the product 6 for which it is necessary to read the product code is specified with an image 7-3 of a rectangular mark. The rectangular mark is merely an example and the invention is not limited thereto. The output unit 18 can achieve a method of determining a projection position of the image 7-3 in a similar way as the method of determining the projection positions of the image 7-1 and the image 7-2 described in the second exemplary embodiment.

The output unit 18 may output the information to the display apparatus 101 in addition to or instead of the image.

Figure 11:
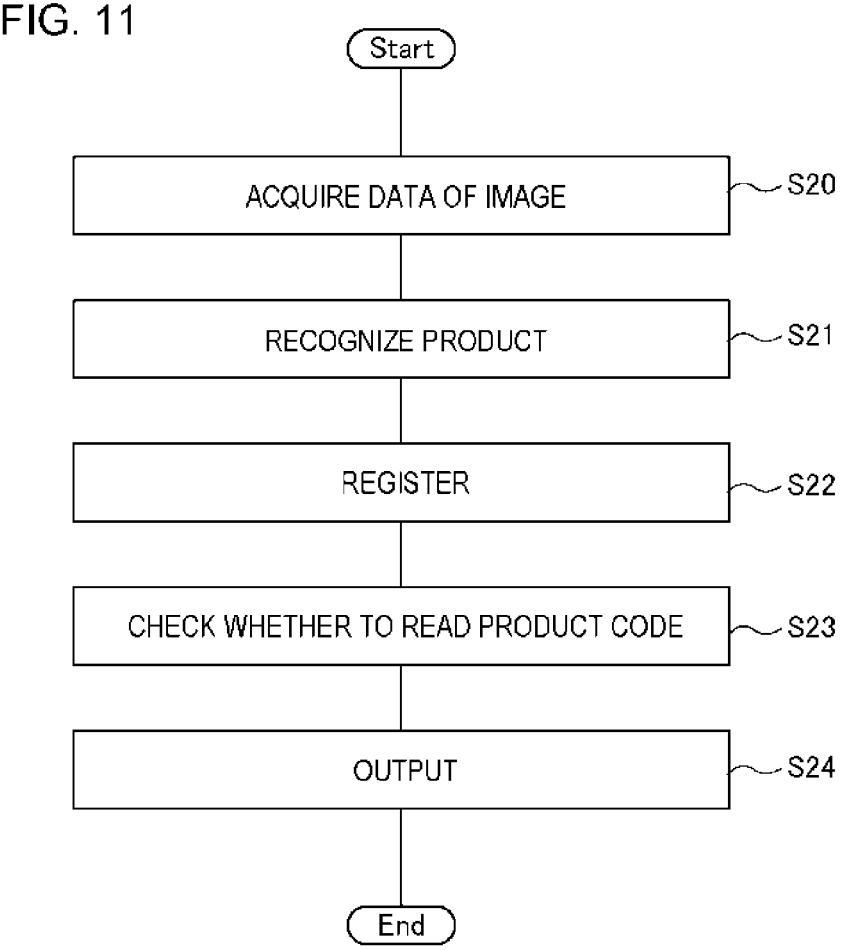
FIG. 11 is a flowchart illustrating an example of a flow of a process of the checkout apparatus according to the exemplary embodiment.

Next, an example of a flow of a process of the checkout apparatus 10 according to the exemplary embodiment will be described with reference to the flowchart of FIG. 11.

First, a shopper browses in a store and put products 6 for purchase into a shopping basket 5. Thereafter, the shopper moves to a location of the checkout apparatus 10 for the checkout process.

Figure 12:
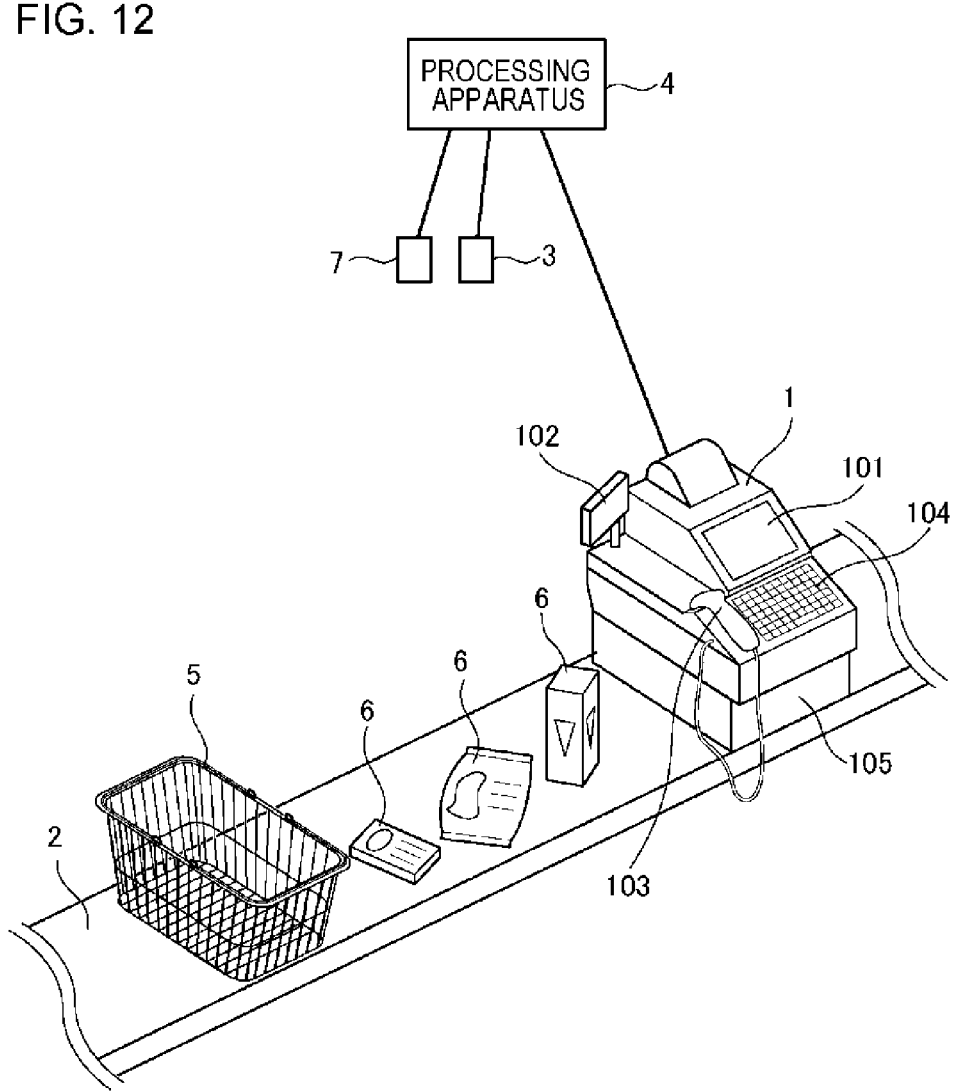
FIG. 12 is a diagram illustrating an application example of the checkout apparatus according to the exemplary embodiment.

A store staff who performs registration work places the products 6 contained in the shopping basket 5 at a predetermined position on the placement surface of the placement platform 2, as illustrated in FIG. 12. Thus, the products 6 are shown in a captured image captured by the imaging apparatus 3.

Then, the image data acquisition unit 11 (the processing apparatus 4) acquires data of the image from the imaging apparatus 3 (S20).

Thereafter, the image analysis unit 12 (the processing apparatus 4) analyzes the data of the image to recognize the products 6 shown in the image. Then, a recognition result is transmitted to the registration apparatus 1.

The registration unit 13 (the registration apparatus 1) registers the recognized products 6 as the product 6 for checkout when the recognition result is received.

The reading necessity or non-necessity check unit 15 (the processing device 4) checks whether the product 6 for which it is necessary to read the product code is included in the products 6 recognized in S21 (S23).

When the product 6 for which it is necessary to read the product code is included in the products 6, the output unit 18 (the processing apparatus 4 and the projection apparatus 7 and/or the registration apparatus 1) outputs the information for specifying the product 6 (S24). For example, as illustrated in FIG. 10, the processing apparatus 4 and the projection apparatus 7 projects the image 7-3 for specifying the product.

Accordingly, the worker operates the code reader 103 (the reading unit 17) of the registration apparatus 1 and reads the product code of the product. Thereafter, the checkout apparatus 10 can perform a predetermined check process based on the information acquired by the reading unit 17. The details of the predetermined check process have been described in the first exemplary embodiment.

When the registration work for all the products 6 for purchase is completed, the store staff performs a checkout process, a payment process, or the like by operating the registration apparatus 1.

For example, the store staff performs a predetermined operation (for example, pressing of "a subtotal" button) on the operation button 104 to complete the registration work. Then, the store staff confirms a total purchase amount displayed on the display apparatus 101 and notifies the total purchase amount to the shopper. Thereafter, the store staff receives a payment from the shopper.

Subsequently, the store staff performs a predetermined operation on the operation button 104 to input the received payment amount. Then, a change amount is displayed on the display apparatus 101 and the drawer 105 is opened. The store staff accommodates the payment in the drawer 105 and extracts the change from the drawer 105. Then, the store staff delivers the extracted change to the shopper.

The flow of the checkout process, the payment process, or the like is merely an example and the process differs according to the configuration of the registration apparatus 1.

According to the above-described exemplary embodiment, it is possible to achieve the operational effects similar to those of the first and second exemplary embodiments.

According to the exemplary embodiment, when the product for which it is necessary to read the product code is included, the information for specifying the product can be output. Accordingly, the worker can perform the reading work for the product code of only the product. In this case, in comparison with a case in which the product codes of all the products are read, improved efficiency of the work is achieved.

In the exemplary embodiment, it is not necessary to image the product code and only the exterior characteristic portion of each product 6 need be imaged. Therefore, as illustrated in FIGS. 10 and 12, the number of imaging apparatuses 3 to be installed can be reduced. As a result, it is possible to realize a reduction in cost of the system and a reduction in a maintenance burden on the system.

Hereinafter, examples of reference exemplary embodiments are appended.

1. An information processing apparatus including:

an image data acquisition unit that acquires data of an image;

an image analysis unit that recognizes a plurality of products in the image using a feature value of an exterior of each of the products registered in a feature value storage unit and the data of the image;

a reading necessity or non-necessity check unit that extracts the product for which it is necessary to read a product code from among the products recognized by the image analysis unit, using an object-to-be-read storage unit in which the product for which it is necessary to read the product code corresponding to each of the products is registered in advance; and a reading unit that reads the product code of the product extracted by the reading necessity or non-necessity check unit.

2. The information processing apparatus described in 1, in which the image analysis unit extracts the product code from an area in the image in which the product for which it is necessary to read the product code is shown, and in which the reading unit reads the product code in the image extracted by the image analysis unit.

3. The information processing apparatus described in 1 or 2, in which the image data acquisition unit acquires data of images from a plurality of directions captured so that a placement surface is contained from the plurality of directions, and in which the image analysis unit analyzes the data of the images from the plurality of directions to extract the product code from the area in the image in which the product for which it is necessary to read the product code is shown.

4. The information processing apparatus described in 2 or 3, further including:

an output unit that outputs guidance information of a method of placing the product for which it is necessary to read the product code when the image analysis unit cannot extract the product code and/or when the reading unit cannot read the product code.

5. The information processing apparatus described in 4, in which the output unit projects an image related to guidance of the placement method on a placement surface.

6. The information processing apparatus described in any one of 1 to 5, further including:

an output unit that outputs information for specifying the product for which it is necessary to read the product code.

7. The information processing apparatus described in 6, in which the output unit projects an image for specifying the product for which it is necessary to read the product code on a placement surface or the product.

8. The information processing apparatus described in any one of 1 to 7, in which a product for which it is necessary to check attachment information included in the product code is registered in the object-to-be-read storage unit.

9. The information processing apparatus described in any one of 1 to 7, in which a product group of the same kind but different volume is registered in the object-to-be-read storage unit.

10. An information processing method performed by a computer, the method including:

an image data acquisition step of acquiring data of an image;

an image analysis step of recognizing a plurality of products in the image using a feature value of an exterior of each of the products registered in a feature value storage unit and the data of the image;

a reading necessity or non-necessity check step of extracting the product for which it is necessary to read a product code from among the products recognized in the image analysis step, using an object-to-be-read storage unit in which the product for which it is necessary to read the product code corresponding to each of the products is registered in advance; and a reading step of reading the product code of the product extracted by the reading necessity or non-necessity check step.

10-2. The information processing method described in 10, in which in the image analysis step, the product code is extracted from an area in the image in which the product for which it is necessary to read the product code is shown, and in which in the reading step, the product code in the image extracted in the image analysis step is read.

10-3. The information processing method described in 10 or 10-2, in which in the image data acquisition step, data of images from a plurality of directions captured so that a placement surface is contained from the plurality of directions is acquired, and in which in the image analysis step, the data of the images from the plurality of directions is analyzed to extract the product code from the area in the image in which the product for which it is necessary to read the product code is shown.

10-4. The information processing method performed by the computer described in 10-2 or 10-3, the method further including:

an output step of outputting guidance information of a method of placing the product for which it is necessary to read the product code when the product code cannot be extracted in the image analysis step and/or when the product code cannot be read in the reading step.

10-5. The information processing method described in 10-4, in which in the output step, an image related to guidance of the placement method is projected on a placement surface.

10-6. The information processing method performed by the computer described in any one of 10 to 10-5, the method further including:

an output step of outputting information for specifying the product for which it is necessary to read the product code.

10-7. The information processing method described in 10-6, in which in the output step, an image for specifying the product for which it is necessary to read the product code is projected on a placement surface or the product.

10-8. The information processing method described in any one of 10 to 10-7, in which a product for which it is necessary to check attachment information included in the product code is registered in the object-to-be-read storage unit.

10-9. The information processing method described in any one of 10 to 10-7, in which a product group of the same kind but different volume is registered in the object-to-be-read storage unit.

11. A program causing a computer to function as:

an image data acquisition unit that acquires data of an image;

an image analysis unit that recognizes a plurality of products in the image using a feature value of an exterior of each of the products registered in a feature value storage unit and the data of the image;

a reading necessity or non-necessity check unit that extracts the product for which it is necessary to read a product code from among the products recognized by the image analysis unit, using an object-to-be-read storage unit in which the product for which it is necessary to read the product code corresponding to each of the products is registered in advance; and a reading unit that reads the product code of the product extracted by the reading necessity or non-necessity check unit.

11-2. The program described in 11, in which the image analysis unit extracts the product code from an area in the image in which the product for which it is necessary to read the product code is shown, and in which the reading unit reads the product code in the image extracted by the image analysis unit.

11-3. The program described in 11 or 11-2, in which the image data acquisition unit acquires data of images from a plurality of directions captured so that a placement surface is contained from the plurality of directions, and in which the image analysis unit analyzes the data of the images from the plurality of directions to extract the product code from the area in the image in which the product for which it is necessary to read the product code is shown.

11-4. The program described in 11-2 or 11-3, causing the computer to further function as:

an output unit that outputs guidance information of a method of placing the product for which it is necessary to read the product code when the image analysis unit cannot extract the product code and/or when the reading unit cannot read the product code.

11-5. The program described in 11-4, in which the output unit projects an image related to guidance of the placement method on a placement surface.

11-6. The program described in any one of 11 to 11-5, causing the computer to further function as:

an output unit that outputs information for specifying the product for which it is necessary to read the product code.

11-7. The program described in 11-6, in which the output unit projects an image for specifying the product for which it is necessary to read the product code on a placement surface or the product.

11-8. The program described in any one of 11 to 11-7,
in which a product for which it is necessary to check attachment information included in the product code is registered in the object-to-be-read storage unit.

11-9. The program described in any one of 11 to 11-7,
in which a product group of the same kind but different volume is registered in the object-to-be-read storage unit.

Priority is claimed on Japanese Patent Application No. 2016-009602, filed on Jan. 21, 2016, the content of which is incorporated herein by reference.

The invention claimed is:

1. An information processing apparatus comprising:
   at least one memory configured to store one or more instructions; and
   at least one processor configured to execute the one or more instructions to:
      capture an image of a plurality of products with an optical imaging unit;
      acquire data of the image comprising exterior features of the plurality of products;
      recognize electronically the plurality of products in the image by using the data of the image;
      electronically extract a product for which it is necessary to read a product code from among the recognized plurality of products;
      read the product code of the extracted product with an optical reader device;
      optically output information for specifying the product for which it is necessary to read the product code, wherein the information is output on a position determined based on a position of the product; and
      complete a checkout process for the plurality of products using the read product code for the product for which it is necessary to read a product code and the data of the image for the plurality of products for which it is not necessary to read a product code, the checkout process including a registration process for registering a product to at least one cash register.

2. The information processing apparatus according to claim 1,
   wherein the at least one processor is further configured to:
      extract the product code from an area in the image in which the product for which it is necessary to read the product code is shown, and
      read the extracted product code.

3. The information processing apparatus according to claim 1,
   wherein the at least one processor is further configured to:
      acquire data of a plurality of images captured from a plurality of directions, and
      analyze the data of the plurality of images to extract the product code from the area in the image in which the product for which it is necessary to read the product code is shown.

4. The information processing apparatus according to claim 2, wherein the at least one processor is further configured to output guidance information of a method of placing the product for which it is necessary to read the product code when the product code cannot be extracted or read.

5. The information processing apparatus according to claim 1,
   wherein the at least one processor is further configured to project an image for specifying the product for which it is necessary to read the product code on the placement platform or the product.

6. The information processing apparatus according to claim 1,
   wherein a product for which it is necessary to check attachment information included in the product code is registered in the at least one memory.

7. The information processing apparatus according to claim 6,
   wherein a product group of the same kind but different volume is registered in the at least one memory.

8. An information processing method performed by a computer, the method comprising:
   capturing an image of a plurality of products with an optical imaging unit;
   acquiring data of the image comprising exterior features of the plurality of products;
   electronically recognizing the plurality of products in the image by using the data of the image;
   electronically extracting a product for which it is necessary to read a product code from among the recognized plurality of products;
   reading the product code of the extracted product with an optical reader device;
   optically outputting information for specifying the product for which it is necessary to read the product code, wherein the information is output on a position determined based on a position of the product; and
   completing a checkout process for the plurality of products using the read product code for the product for which it is necessary to read a product code and the data of the image for the plurality of products for which it is not necessary to read a product code, the checkout process including a registration process for registering a product to at least one cash register.

9. A non-transitory storage medium storing a program causing a computer to:
   capture an image of a plurality of products with an optical imaging unit;
   acquire data of the image comprising exterior features of the plurality of products;
   electronically recognize the plurality of products in the image by using the data of the image;
   electronically extract a product for which it is necessary to read a product code from among the plurality of recognized products;
   read the product code of the extracted product with an optical reader device;
   optically output information for specifying the product for which it is necessary to read the product code, wherein the information is output on a position determined based on a position of the product; and
   complete a checkout process for the plurality of products using the read product code for the product for which it is necessary to read a product code and the data of the image for the plurality of products for which it is not necessary to read a product code, the checkout process including a registration process for registering a product to at least one cash register.

10. The information processing apparatus according to claim 2,
    wherein the at least one processor is further configured to:
       acquire data of a plurality of images captured from a plurality of directions, and
       analyze the data of the plurality of images to extract the product code from the area in the image in which the product for which it is necessary to read the product code is shown.

11. The information processing apparatus according to claim 3,
wherein the at least one processor is further configured to output guidance information of a method of placing the product for which it is necessary to read the product code when the product code cannot be extracted or read.

12. The information processing apparatus according to claim 10,
wherein the at least one processor is further configured to output guidance information of a method of placing the product for which it is necessary to read the product code when the product code cannot be extracted or read.

13. The information processing apparatus according to claim 2,
wherein a product for which it is necessary to check attachment information included in the product code is registered in the at least one memory.

14. The information processing apparatus according to claim 3,
wherein a product for which it is necessary to check attachment information included in the product code is registered in the at least one memory.

15. The information processing apparatus according to claim 4,
wherein a product for which it is necessary to check attachment information included in the product code is registered in the at least one memory.

* * * * *